United States Patent [19]
Ratony

[11] 3,981,460
[45] Sept. 21, 1976

[54] STAGGERED CHANNEL WING-TYPE AIRCRAFT

[75] Inventor: Alexander Ratony, Simi Valley, Calif.

[73] Assignee: Robert N. Starr, North Hollywood, Calif.

[22] Filed: Aug. 30, 1973

[21] Appl. No.: 393,220

[52] U.S. Cl. .............................. 244/13; 244/45 R
[51] Int. Cl.² ............................................ B64C 3/06
[58] Field of Search ............... 244/13, 37, 45, 34 R, 244/34 A, 35 R, 35 A, 40

[56] References Cited
UNITED STATES PATENTS

| | | | |
|---|---|---|---|
| 1,264,037 | 4/1918 | Emmons | 244/45 R |
| 1,453,830 | 5/1923 | Coakley | 244/45 R |
| 1,558,958 | 10/1925 | Williams | 244/37 |
| 1,871,465 | 8/1932 | Park et al. | 244/45 R |
| 2,147,968 | 2/1939 | Delanne | 244/45 R |
| 3,284,028 | 11/1966 | Robertson | 244/35 R |
| 3,411,738 | 11/1968 | Sargent | 244/40 |
| 3,834,654 | 9/1974 | Miranda | 244/13 |

FOREIGN PATENTS OR APPLICATIONS

| | | | |
|---|---|---|---|
| 43,697 | 8/1910 | Austria | 244/45 R |
| 790,201 | 11/1935 | France | |
| 252,481 | 3/1927 | Italy | 244/35 R |
| 7,321 | 2/1912 | United Kingdom | 244/45 R |
| 12,061 | 2/1913 | United Kingdom | 244/35 R |

*Primary Examiner*—Trygve M. Blix
*Assistant Examiner*—Galen L. Barefoot

[57] ABSTRACT

Disclosed is a staggered channel wing-type aircraft comprising a reverse staggard lower and upper wing which relates to aircraft of the type generally described as a short takeoff and landing vehicle (STOL) and more particularly to an improved version thereof having superior low speed handling characteristics in both takeoff and landing and an economical high speed cruise configuration. Also having an improved gliding characteristic and easy storage because the wingspan is reduced to a minimum but keeping still rather large wing area.

3 Claims, 16 Drawing Figures

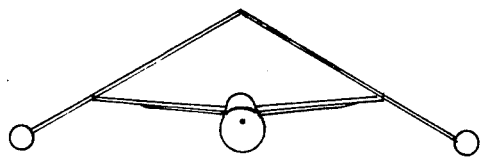
FIG. 5.            FIG. 6.
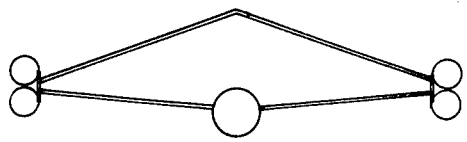
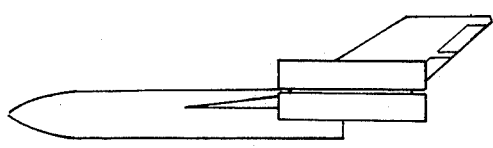
FIG. 7.            FIG. 8.
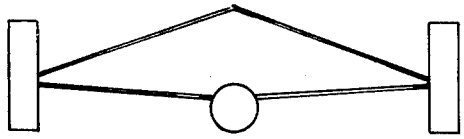
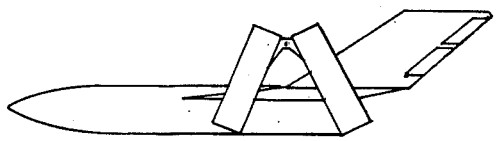
FIG. 9.            FIG. 10.
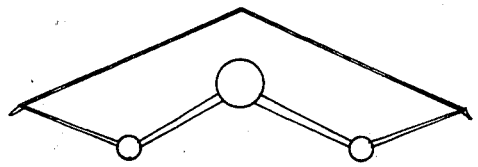
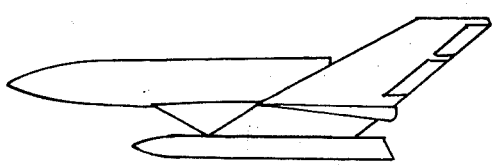
FIG. 11.            FIG. 12
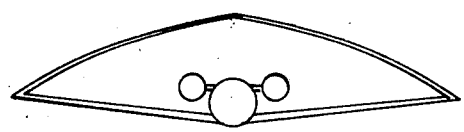
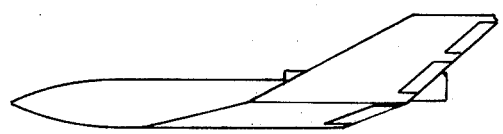
FIG. 13.            FIG. 14.
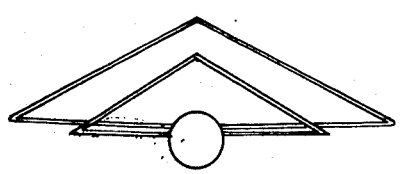
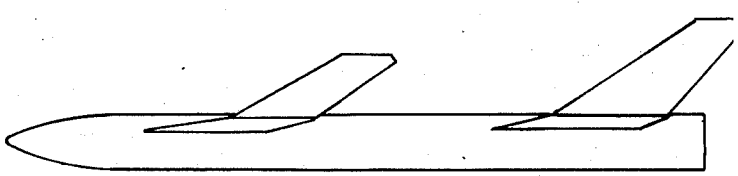
FIG. 15.            FIG. 16.

STAGGERED CHANNEL WING-TYPE AIRCRAFT

DESCRIPTION OF THE PRIOR ART

As we know conventional aircraft today are built for low speed or high speed. In low speed aircraft, the wingspan is usually large, which creates a tremendous amount of drag, and because of this drag the airplane is slow. On high speed aircraft, usually the wingspan is reduced to a minimum to eliminate the drag and is counterbalanced with high powered engines. Because of this short wingspan, heavy engine and equipment, the airplane has no gliding ability. Thus the stalling speed of this aircraft is very high, which makes the aircraft uncontrollable at the low speed in case of engine failure. These type of aircraft need super long runways to land and take off which limit all of these aircraft in about 70% of the airfields (except military) in this country and possibly more overseas. These limitations of todays' aircraft led me to this new invention and design of this staggered channel wing design to create the flying characteristics of a glider and the speed of a supersonic jet aircraft. I believe that this type of arrangement of the wings reduces the drag problem, but creates the ability of high speed and improves the handling of all types of aircraft.

SUMMARY OF INVENTION

It is accordingly the general object of the present invention to provide an improved stol aircraft capable of high speed flights and a relatively low speed landing with or without power, on small unimproved airstrips. It is also the object of this invention to be able to use less power, and improve speed variance from a very slow to a supersonic speed. It is also the object of this invention to show that the wing configuration in this design is adaptable for a re-entry vehicle by folding the wings into an elongated staggered position thus eliminating 90% of the existing drag. As the craft re-enters and the atmosphere slows the aircraft down the wings are opened up to its original position, and slows the aircraft down to a comfortable, gliding and controllable landing speed.

And the further object of this invention is that this wing configuration allows its usage from a toy glider to a highly sophisticated supersonic jet or re-entry vehicle with very little overall design modifications. It is also the object of this invention to show that this wing configuration could be adapted to a jet powered amphibian supersonic aircraft which today to our knowledge does not exist.

It is further the object of this invention that the wing design and fuselage configuration makes it adaptable to a vertical takeoff aircraft.

It is further the object of this invention to show that this wing configuration is adaptable to a transport or a cargo type aircraft by using a double set of wings to allow a super large fuselage for more load carrying capability, yet keeping the same gliding ability as the original design.

And it is also the object of this invention to make it possible for a homebuilder to build an inexpensive, safe and fast experimental aircraft.

It is also the object of this invention that the fuselage of this aircraft design eliminates useless hard to construct spaces and also eliminating the problem of stress and drag. It is the further object of this invention that this wing configuration minimizes if not completely eliminates sonic booms.

It is further the object of this invention that conventional type aircraft has a load factor problem, which means that an airplane only has high lifting capabilities when it's traveling in a horizontal position, and only at this point the maximum lift occurs. However, if the airplane makes a 90° bank, the load factor required is infinite because there is no lifting surface at this angle. However, in my design there is a safe load factor even at a 90° banking. As a matter of fact, at this angle the load factor required never exceeds 2.92 which is the safe hold angle of a conventional aircraft at a 70° bank.

BRIEF DESCRIPTIONS OF THE DRAWINGS

FIG. 5 is a front view of an amphibian type aircraft.

FIG. 6 is a side view of FIG. 5.

FIG. 7 is a schematic view of my design showing a vertical type takeoff vehicle where two engines are mounted at the tip of the wings.

FIG. 8 is a side view of FIG. 7.

FIG. 9 is the front view of FIG. 7 with the engines in a vertical position.

FIG. 10 is a side view of FIG. 9 showing the engines in an upside down "V" position for equal distribution of thrust necessary for vertical takeoff.

FIG. 11 is a front view of another configuration for an amphibian type aircraft where the pontoons are located in the midway section of the wing.

FIG. 12 is a side view of FIG. 11. As plainly seen, this design is also adaptable for a jet propelled aircraft.

FIG. 13 is a twin-engined jet with the same basic design as FIG. 1 with the exception of the upper wing section curved in a semi bow instead of a straight triangular form.

FIG. 14 is a side view of FIG. 13.

FIG. 15 is a front view of a cargo or transport type aircraft. In this case double sets of wings are used. The front wings should be smaller than the rear wings to provide the correct balance of the aircraft in flight.

FIG. 16 is a side view of FIG. 15.

DESCRIPTION OF THE PREFERRED EMBODIMENTS

As seen in previous figures the basic design concept is adaptable to many configurations and could be made into numerous more designs and still keep the same basic principle of my invention.

Figure 1:
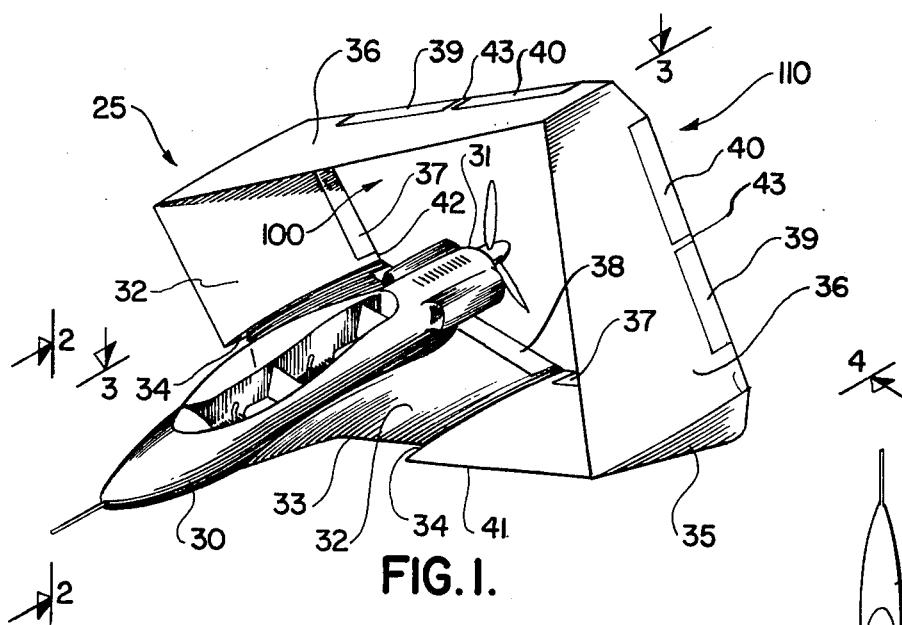
FIG. 1 is a perspective view of a pusher type aircraft configuration of my design and invention having a triangular staggered type wing construction.
Figures 2, 3:
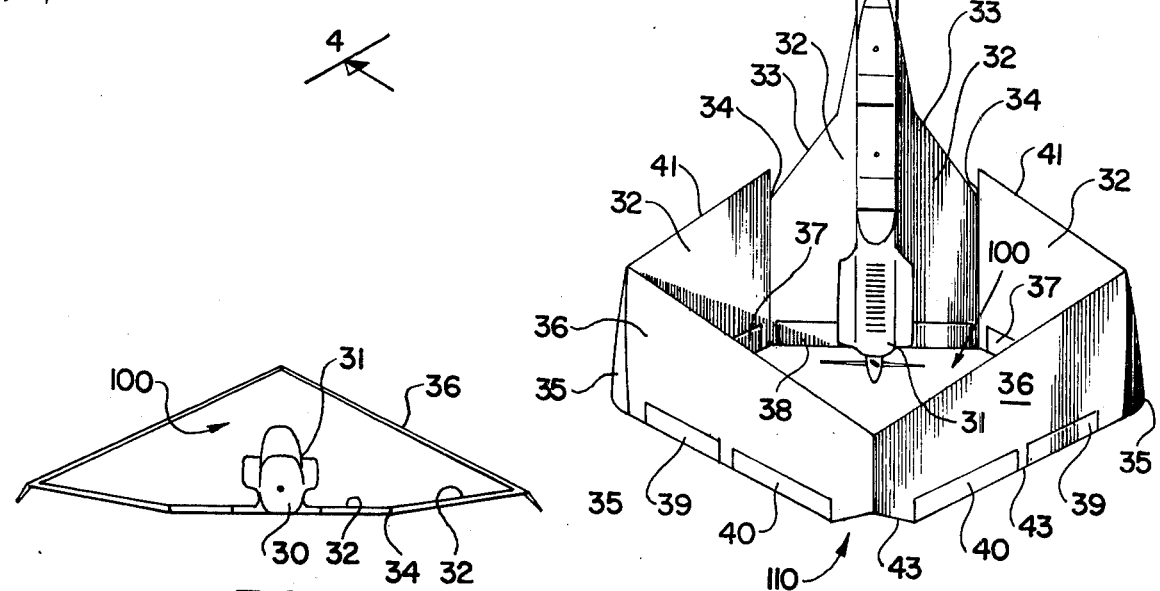
FIG. 2 is a front view of FIG. 1 showing clearly the triangular construction of the wing.
FIG. 3 is a top view of FIG. 1 giving a diamond shape Delta type aircraft appearance and its outline suggests its adaptability to a jet type aircraft with only the change of the engine.
Figure 4:
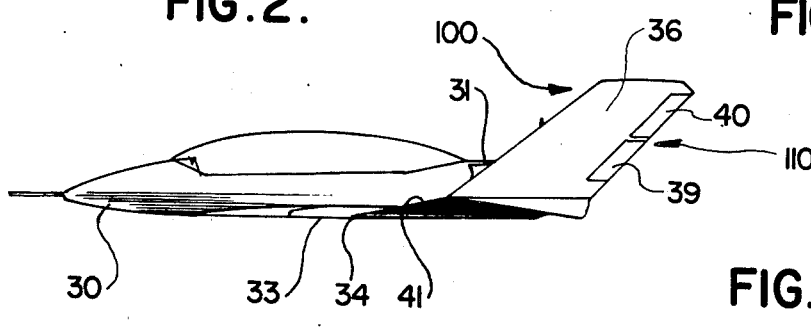
FIG. 4 is a side view of FIG. 1 showing its streamlined aerodynamic design of the wing construction.

Referring to configuration shown in FIGS. 1, 2, 3 and 4, the stol aircraft referred to by the numeral 25 has a generally diamond like Delta shaped wing design which has a single fuselage 30, much like any other aircraft. Engine housing 31, located in the rear (although it could have a pusher-puller type configuration, in other words having an engine both in the front and rear or only in the front for a puller type aircraft) lower wings 32, are swept back in a streamlined position (approximately a 45° angle) with a fairly sharp leading edge 33. At the midway of wing 32 is a dihedral 34 begins which gives the plane an excellent stability. Wing tip 35 protrudes downwards to lock in escaping airflow (vortex) to give the craft a stol characteristic. Top wings 36 are swept back inward and upward in a triangular pyramid-like configuration. Lower wings 32 have two flaps 37 for control of banking and turns and one flap 38 for landing. Top wing sections have two directional flaps 39 and two landing or braking flaps, or combination directional flaps 40. On lower wings 32 at the section where the dihedral 34 starts, the wing edge 41 protrudes forward and sharpens this leading edge. The principle of the design is to pull air through on an area generally described by the numeral 100 and pushed through the area described by numeral 110. The air passing through area 100 at the tailing edges 42 of airfoil or wing 33 leaves a turbulence which is picked up by the wings 36 and so floats on this turbulent air cushion. The top wings 36 directs this airflow out on the tailing edge 43 of wings and closes (theoretically) the vortex left behind of lower wing thus eliminating a double vortex and thus creates one vortex which in turn eliminates the chances of creating sonic booms at supersonic speeds. Having described in detail the structure and operation of my stol type aircraft design, it will now be apparent to those skilled in the art that numerous modifications can be added to the invention without departing from the spirit of the invention and design.

What is claimed is:

1. A staggered channel wing type aircraft comprising:
   a fuselage with a nose and a passenger section;
   a pusher type propulsion means mounted behind said passenger section, said fuselage being free of any tail structure;
   a lower pair of wings swept rearward from said fuselage;
   an upper pair of wings rigidly attached at the wing tips of said lower pair and swept back, inward and upward from said tips and secured together to form a triangular pyramid-like configuration with the upper wings being free from the fuselage and from vertical fins and both upper and lower wings having control surfaces thereon for controlling the aircraft about the roll, pitch and yaw axes.

2. The aircraft as claimed in claim 1 including a small fin on each of said wing tips, said fin extending downwardly from said wing tip and swept backwardly in an extreme sweep, meeting the front leading edge of said wing tip in a point.

3. The aircraft as claimed in claim 1, wherein said lower pair of wings each comprise a dihedral wing having a dihedral angle between said fuselage and said wing tip.

* * * * *